US011587564B2

(12) United States Patent
Aher et al.

(10) Patent No.: US 11,587,564 B2
(45) Date of Patent: Feb. 21, 2023

(54) ENHANCING SIGNATURE WORD DETECTION IN VOICE ASSISTANTS

(71) Applicant: Rovi Guides, Inc., San Jose, CA (US)

(72) Inventors: Ankur Anil Aher, Maharashtra (IN); Jeffry Copps Robert Jose, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 50 days.

(21) Appl. No.: 16/853,326

(22) Filed: Apr. 20, 2020

(65) Prior Publication Data

US 2021/0327420 A1    Oct. 21, 2021

(51) Int. Cl.
*G10L 15/22*   (2006.01)
*G10L 15/14*   (2006.01)
*G10L 15/06*   (2013.01)
*G06N 3/049*   (2023.01)
*G10L 15/08*   (2006.01)

(52) U.S. Cl.
CPC .............. *G10L 15/22* (2013.01); *G06N 3/049* (2013.01); *G10L 15/063* (2013.01); *G10L 15/144* (2013.01); *G10L 2015/0638* (2013.01); *G10L 2015/088* (2013.01); *G10L 2015/223* (2013.01); *G10L 2015/228* (2013.01)

(58) Field of Classification Search
CPC ......... G10L 15/22; G10L 15/00; G10L 15/04; G10L 15/06; G10L 15/063; G10L 15/08; G10L 15/14; G10L 15/16; G10L 15/183; G10L 15/20; G10L 15/26; G10L 2015/0631–0638; G10L 2015/223–228

USPC ........ 704/270.127, 275, 231, 243, 245, 250, 704/251, 255, 270.1, 270
See application file for complete search history.

(56) References Cited

U.S. PATENT DOCUMENTS

| 8,380,504 | B1 | 2/2013 | Peden et al. |
|---|---|---|---|
| 2014/0222436 | A1 | 8/2014 | Binder et al. |
| 2015/0302855 | A1 | 10/2015 | Kim et al. |
| 2016/0260436 | A1 | 9/2016 | Lemay et al. |
| 2017/0133009 | A1 | 5/2017 | Cho et al. |
| 2018/0173494 | A1 | 6/2018 | Choi et al. |
| 2018/0190296 | A1 | 7/2018 | Williams et al. |
| 2019/0066670 | A1 | 2/2019 | White et al. |
| 2019/0156818 | A1 | 5/2019 | Piersol et al. |
| 2019/0228779 | A1 | 7/2019 | Lesso |
| 2019/0295544 | A1 | 9/2019 | Garcia et al. |

(Continued)

OTHER PUBLICATIONS

PCT Search Report and Written Opinion for International Application No. PCT/US2020/066932, dated Apr. 16, 2021.
U.S. Appl. No. 16/853,322, filed Apr. 20, 2020, Ankur Anil Aher.

*Primary Examiner* — Qi Han
(74) *Attorney, Agent, or Firm* — Haley Guiliano LLP

(57) ABSTRACT

Systems and methods detecting a spoken sentence in a speech recognition system are disclosed herein. Speech data is buffered based on an audio signal captured at a computing device operating in an active mode. The speech data is buffered irrespective of whether the speech data comprises a signature word. The buffered speech data is processed to detect a presence of the sentence comprising at least one command and a query for the computing device. Processing the buffered speech data includes detecting the signature word in the buffered speech data, and in response to detecting the signature word in the speech data, initiating detection of the sentence in the buffered speech data.

20 Claims, 8 Drawing Sheets

(56) References Cited

U.S. PATENT DOCUMENTS

| | | |
|---|---|---|
| 2020/0005768 A1 | 1/2020 | Chae |
| 2020/0184966 A1 | 6/2020 | Yavagal |
| 2020/0301661 A1* | 9/2020 | Pasko .................... G10L 15/32 |
| 2021/0074292 A1* | 3/2021 | Gruenstein ............. G10L 25/51 |
| 2021/0233515 A1* | 7/2021 | Piersol ................... G10L 15/08 |
| 2021/0343285 A1* | 11/2021 | Smith .................... G10L 15/32 |

* cited by examiner

ENHANCING SIGNATURE WORD DETECTION IN VOICE ASSISTANTS

BACKGROUND

The present disclosure relates to speech recognition systems and, more particularly, to systems and methods related to speech-assisted devices with signature word recognition.

SUMMARY

Smart voice-assisted devices, smart devices commanded to perform certain tasks, are now ubiquitous to modern households and the commercial sector. The utterance of a signature word or phrase signals the device of a command or a query intended for the device to perform. The phrase "Ok, Google, play Game of Thrones!", when spoken clearly into a Google-manufactured voice-assisted system, is commonly known to cause the device to carry out the user command to play the television series "Game of Thrones" on a media player, for example. Similarly, uttering "Alexa, please tell me the time!" causes a properly configured speech-recognition device, such as the Amazon Echo, to announce the current time. Both "Ok, Google" and "Alexa", spoken within an acceptable range of a corresponding properly configured device, trigger a device reaction. But in the absence of a signature word, and particularly a signature word that precedes each user command or query, the device fails to take the commanded action and instead performs no response. The voice-assisted device is effectively deaf to a user command without a preceding signature word. The signature word is therefore key to the operation of voice-assisted devices. What is perhaps even more key to the proper operation of such devices is the order in which the signature word appears in the spoken command or query. That is, what grabs the attention of a smart voice-assisted device to carry out a user-voiced command, e.g., "Play Game of Thrones" or "Please tell me the time," is not only a signature word but also the utterance of the signature word in a predefined order, immediately before the spoken command, a structured and rather rigid approach to proper processing of a user command.

Repeating a signature word before uttering a command or query may seem somewhat burdensome or unnatural for some users. It is rather atypical, for instance, for a friend to call a person by their name each time before uttering a sentence directed to the friend. "Jack, please stop watching tv," followed by "Jack, please get my bag from the table," followed by "Jack, let's go" sounds awkward and unusual. Speaking a signature word in the beginning, middle or the end of a query or command should serve no consequence, yet, in today's devices, it does.

It is no secret that voice-assisted devices raise privacy concerns by capturing vast amounts of recognizable and private communication spoken within a speaking range of the device. Long before a signature word, such as "Ok, Google," "Alexa" or "TIVO," is detected, all surrounding conversations are locally or remotely recorded. Moreover, certain privacy regulations remain unaddressed. Absent proper user consent, an entire household of speech and conversation, over a span of numerous days, weeks, months, and in many cases years, are unnecessarily and intrusively recorded and made available to a remotely located device manufacturer, completely removed from user control. Worse yet, many users remain ignorant of voice-assisted data collection privacy violations. Recent privacy law enactments, in Europe, California, and Brazil, for example, demand manufacturers to place privacy rights of their users front and center by requiring express user consent before user data collection, a condition not readily met by current-day smart devices.

Accordingly, a less stringent and less intrusive electronic voice assistant device, one without a strict pre-command signature word requirement and with a more natural user communication protocol, would better serve a voice-assistant user. In accordance with various speech recognition embodiments and methods disclosed herein, a user event indicative of a user intention to interact with a speech recognition device is detected. In response to detecting the user event, an active mode of the speech recognition device is enabled to record speech data based on an audio signal captured at the speech recognition device irrespective of whether the speech data comprises a signature word. While the active mode is enabled, a recording of the speech data is generated, and the signature word is detected in a portion of the speech data other than a beginning portion of the speech data. In response to detecting the signature word, the recording of the speech data is processed to recognize a user-uttered phrase.

In some embodiments, a method of detecting a sentence includes at least one of a command and a query in a speech recognition system. Speech data is buffered based on an audio signal captured at a computing device operating in an active mode. The speech data is buffered irrespective of whether the speech data comprises a signature word. The buffered speech data is processed to detect the presence of a sentence comprising at least one command and the query for the computing device. Processing the buffered speech data includes detecting the signature word in the buffered speech data, and, in response to detecting the signature word in the speech data, initiating detection of the sentence in the buffered speech data.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
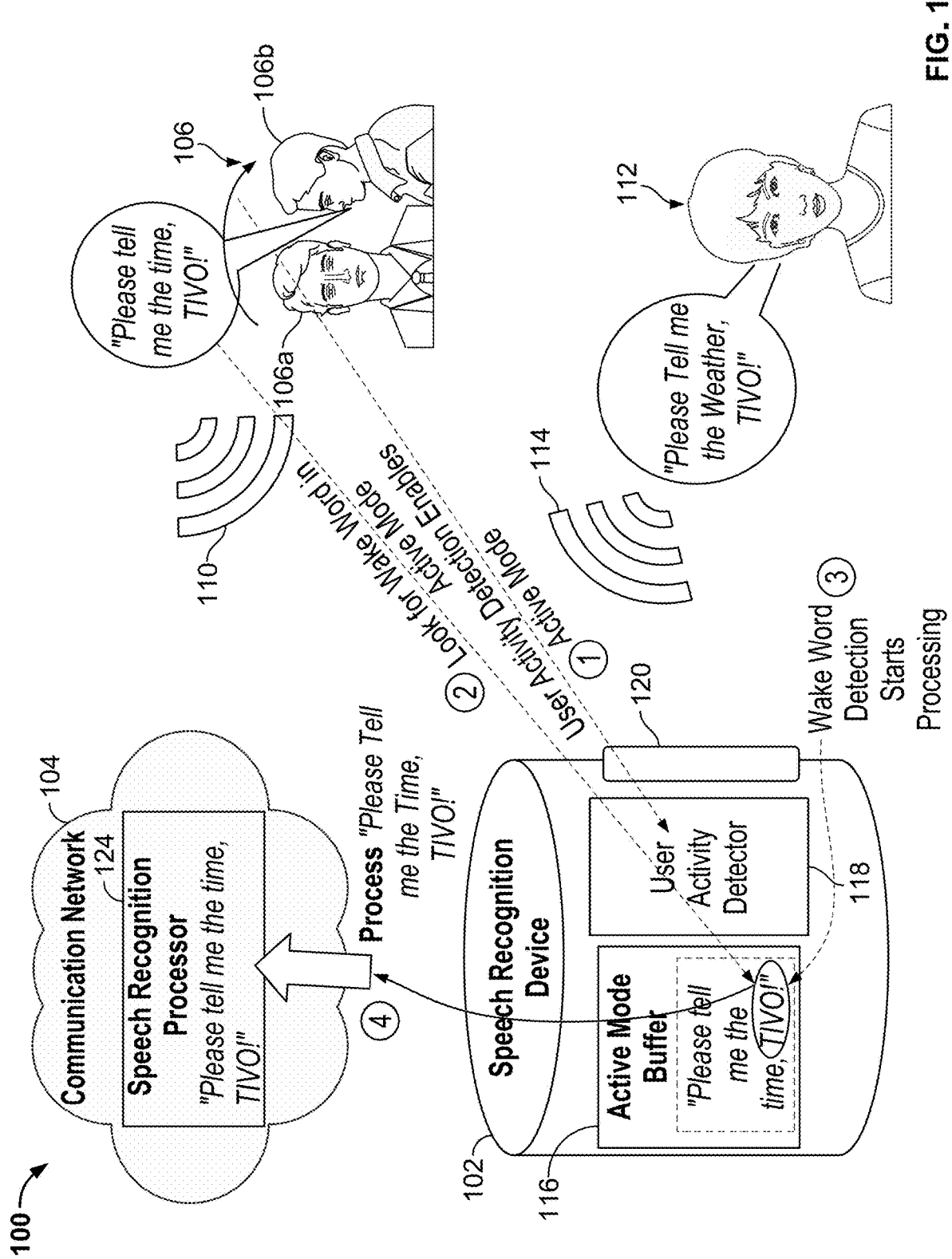
FIGS. 1-2 each show an illustrative block diagram of a distinct speech recognition system, in accordance with some embodiments of the disclosure.

FIG. 1 shows an illustrative block diagram of speech recognition system 100, in accordance with some embodiments of the present disclosure. System 100 is shown to include a speech recognition device 102 communicatively coupled to a communication network 104, in accordance with various disclosed embodiments. Speech recognition device 102 is shown to include an active mode buffer 116, a user activity detector 118 and an audio signal receiver 120. Communication network 104 is shown to include a speech recognition processor 124. In some embodiments, speech recognition device 102 may be implemented, in part or in whole, in hardware, software, or a combination of hardware and software. For example, a processor (e.g., control circuitry 704 of FIG. 7) executing program code stored in a storage location, such as storage 708 of FIG. 7, may perform, in part or in whole, some of the speech recognition functions of device 102 disclosed herein. Similarly, speech recognition processor 124 may be implemented, in part or in whole, in hardware, software, or a combination of hardware and software. For example, a processor (e.g., control circuitry 704 of FIG. 7) executing program code stored in a storage location, such as storage 708 of FIG. 7, may perform, in part or in whole, some of the speech recognition functions of processor 124 disclosed herein.

Communication network 104 may be a wide area network (WAN), a local area network (LAN), or any other suitable network system. Communication network 104 may be made of one or multiple network systems. In some embodiments, communication network 104 and device 102 are communicatively coupled by one or more network communication interfaces. In some example systems, communication network 104 and device 102 are communicatively coupled by the interfaces shown and discussed relative to FIG. 7. Communication network 104 and device 102 may be communicatively coupled in accordance with one or more suitable network communication interfaces.

In accordance with an embodiment, speech recognition device 102 receives audio signals at audio signal receiver 120, processes the received audio signals locally for speech recognition, and transmits the processed audio signals to communication network 104 for further speech recognition processing. For example, speech recognition device 102 may receive audio signals 110 and 114 from each of users 106 and 112, respectively, process the received signals 110 and 114 for speech processing with user activity detector 118 and active mode buffer 116 and transmit the processed audio signals to speech recognition processor 124 of communication network 104 for further voice recognition processing. In some embodiments, processor 124 transmits the processed speech file to a third-party transcription service for automated speech recognition to translate voice into text and receive a text file corresponding to the transmitted processed speech file. For example, processor 124 may send the processed speech file to Amazon Transcribe and Google Speech-to-Text.

In some embodiments, user activity detector 118 includes detecting and sensing components sensitive to recognizing a physical change related to the user, such as, but without limitation, a physical user movement closer in proximity to speech recognition device 102. For example, user 106 may make a sudden physical head turn from a starting position 106a not directly facing the audio signal receiver 120 of device 102, to a turned position 106b, directly facing the audio signal receiver 120 of device 102. To user activity detector 118, the detected user 106 turn action signals a soon-to-follow audio signal 110 with a command or an assertion speech originating from user 106 or from the direction of user 106. In contrast, in the absence of a physical change in user 112, activity detector 118 detects no user activity, user movement or audio strength change, from user 112 or from the direction of user 112 that may suggest user 112 is possibly interested in interacting with device 102.

User activity detector 118 may detect a user event in a variety of ways. For example, user activity detector 118 may implement a motion detection function, using a motion detector device, to sense user 106 turn motion from position 106a to position 106b. Activity detector 118 may alternatively or in combination implement a spectral analysis technique, using a spectral analyzer device, to detect an increased audio signal amplitude when receiving audio signal 110, corresponding to user 106, as user 106 turns from position 106a to position 106b, directly facing audio signal receiver 120 of device 102. Still alternatively or in combination, activity detector 118 may implement an image capturing function, using an image capturing device such as, without limitation, a digital camera, that captures images showing the user 106 turn movement from position 106a to position 106b. Device 102 may employ any suitable technique using a corresponding suitable component that helps detect a closer proximity of user 106 to device 102. In the non-active mode where device 102 is waiting to detect a user movement, such as discussed above, device 102 remains in a continuous intimation detection mode with functionality limited, in large part, to the detection with a reduced power consumption requirement. In response to a detected user activity, device 102 enables an active mode.

Figure 7:
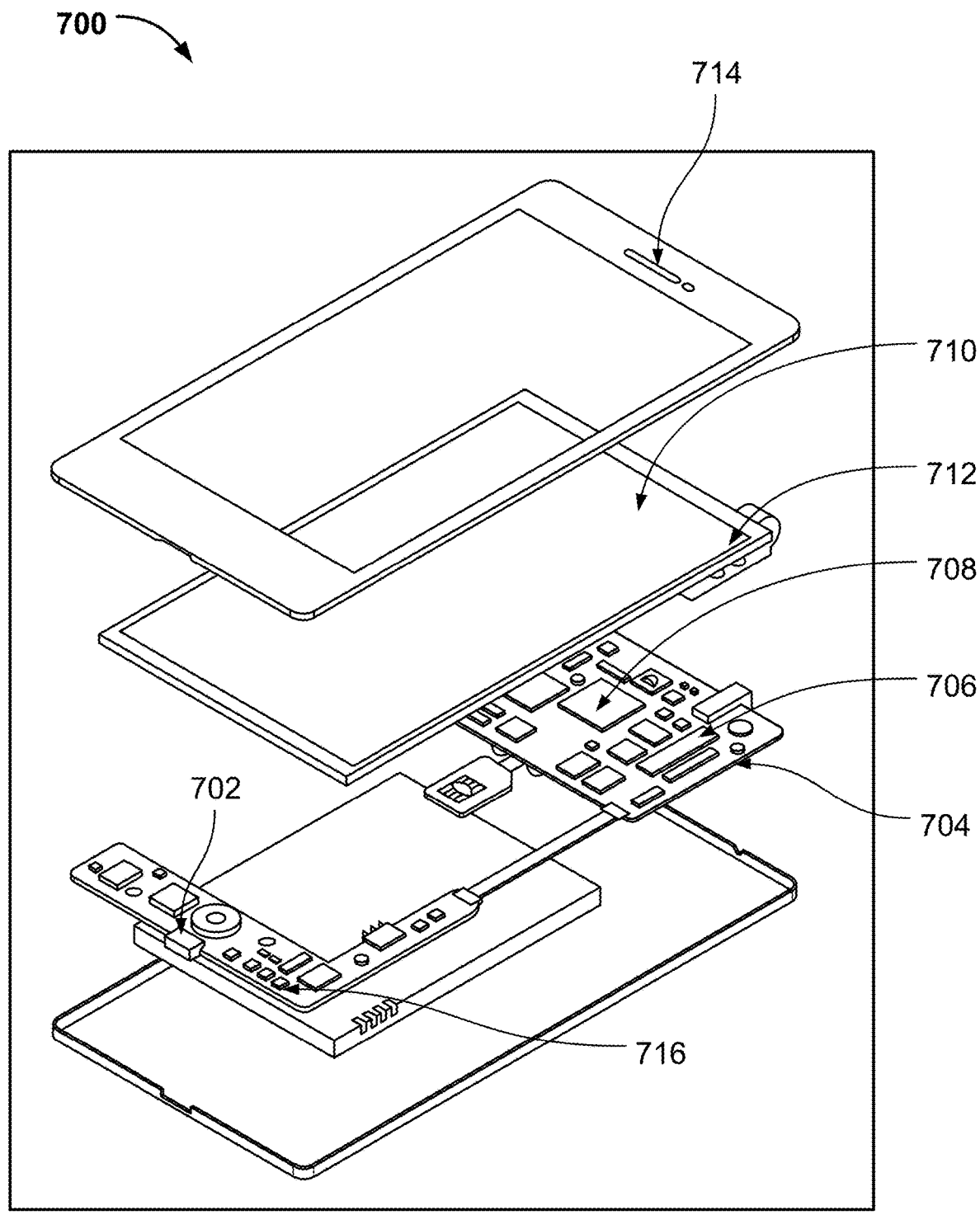
FIG. 7 is a block diagram of an illustrative user device, in accordance with some embodiments of the present disclosure.

In the active mode, device 102 may start to record incoming audio signals, such as signal 110, in a storage location, such as storage 708 (FIG. 7). Audio signal 110 is made of audio/speech chunks, packets of speech data. In some embodiments, device 102 saves the speech data packets in the active mode, in active mode buffer 116. Buffer 116 may be a part of or incorporated in storage 708 (FIG. 7). Audio signal receiver 120 may be a microphone internally or externally located relative to device 102.

In accordance with an example operational application, device 102 is a TIVO voice-enabled product. As depicted in FIG. 1, at 1), user activity detector 118 senses the user 106 turn movement from position 106a to position 106b and, in response to detecting the user turn, device 102 enables its active mode. While in the active mode, device 102 starts to record incoming user utterances in the form of packets of speech data and, at 2), looks for a signature word in the incoming speech data packets. Device 102 stores the incoming speech data packets in active mode buffer 116, a local storage location. At 3), in response to detecting the signature word, for example, signature word "TIVO," in a user 106 utterance, i.e., "Please tell me the time, TIVO!", device 102 begins a processing phase by transmitting the recorded speech data packets, in the form of an audio file, from buffer 116 to communication network 104. Detection of the signature word, "TIVO," at 3) in FIG. 1, effectively starts the processing of the received speech data packets. At communication network 104, the transmitted packets are processed to recognize the user utterance "Please tell me the time, TIVO!", as shown at 4) in FIG. 1. As used herein, the term "signature word" refers to a word, phrase, sentence, or any other form of utterance that addresses a smart assistance device.

In some embodiments, recording, prompted by a user activity as discussed above, continues even after transmission and processing of the packets begins at communication network 104. In some embodiments, recording stops in response to packet transmission to and processing by communication network 104.

As earlier noted, device 102 records user 106 utterances locally without sharing the recorded information with communication network 104 for privacy reasons. User speech is therefore maintained confidentially until a signature word detection. In the case where no signature word is detected, no recording of user utterances is generated. In some embodiments, in furtherance of user privacy protection, prior to starting to generate a recording, device 102 may request a privacy consent (e.g., consent to the collection of user speech) confirmation from user 106 and may further condition the recording on receiving the consent. That is, device 102 simply does not record user utterances even in the presence of a signature word detection unless a user consent acknowledgement is received. For example, device 102 may generate a display on a user device, such as a user smartphone or a user tablet, with privacy terms to be agreed to by the user. Device 102 may wait to receive a response from the user acknowledging consent to the terms by, for example, clicking a corresponding box shown on the user device display.

In some embodiments, device 102 encrypts speech data packets corresponding to user 106 utterances, for example, utterance "Please tell me the time, TIVO!", before storing or recording the packets in buffer 116, as yet another added security measure to ensure meeting stringent legal privacy requirements.

In accordance with some embodiments, the signature word, "TIVO," is detected despite its location in the user-uttered phrase. "TIVO" may appear in the beginning, middle, end, or anywhere in between, in the phrase "Please tell me the time" yet be recognized in accordance with some disclosed embodiments and methods. For example, the user 106 turn (from 106a to 106b) sets off a recording session guaranteeing preservation of the signature word despite the signature word location in the phrase.

As previously indicated, the speech data packets may be saved in a single and local physical buffer with no other storage location necessitated, in part, because pre-active mode recording is unnecessary. This single buffer approach is yet another effective device 102 energy-conservation measure.

Figure 2:
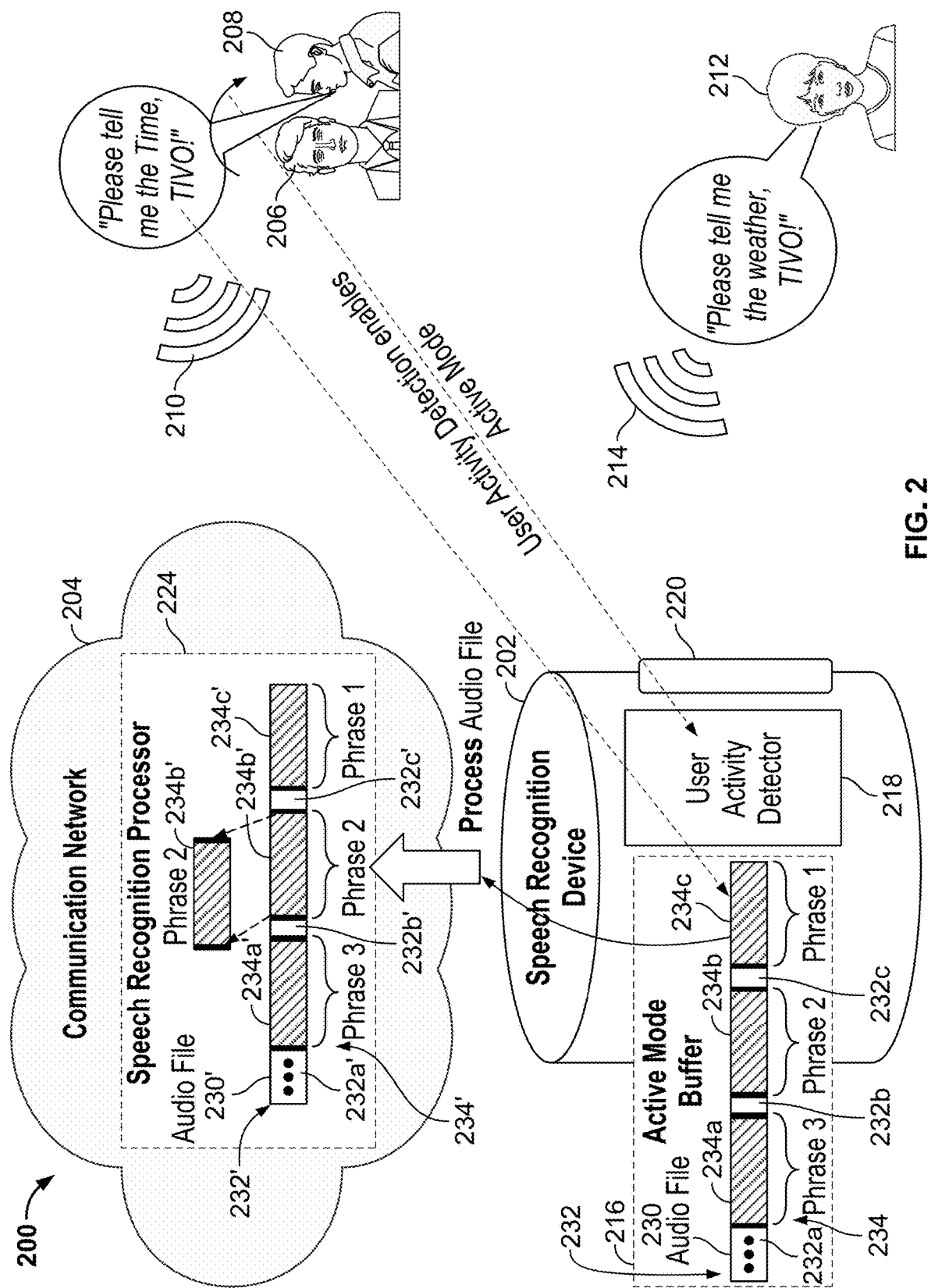

FIG. 2 shows an illustrative block diagram of speech recognition system 200, in accordance with some embodiments of the present disclosure. In an example embodiment, as discussed below, system 200 is configured as system 100 of FIG. 1 with further processing features shown and discussed relative to FIG. 2.

System 200 is shown to include a speech recognition device 202 communicatively coupled with a communication network 204. With continued reference to the operational example of FIG. 1, in FIG. 2, an activity detector 218 of device 202 detects a turn motion from position 206a to position 206b by user 206 and, in response to the detection, device 202 enables the active mode. In the active mode, device 202 records incoming speech data packets corresponding to the user utterance "Please tell me the time, TIVO!", in active mode buffer 216. Analogous to the example of FIG. 1, in FIG. 2, device 102 stores at least speech data packets corresponding to three phrases 234, namely phrases 1, 2, and 3 (234a, 234b, and 234c), originating from user 206, in buffer 216. The phrases are stored in an audio file 230 in buffer 216. Audio buffer 230 may have a different number of phrases than that shown and discussed herein.

Audio file 230 further includes silent durations 232, each of which (silent duration 232a, silent duration 232b, and silent duration 232c) is located between two adjacent phrases in audio file 230. In some embodiments, device 102 performs some or all audio file processing locally. For example, device 102 may perform detection and recognition of a sentence, as disclosed herein, locally. In some embodiments, device 102 and a speech recognition processor 224 of communication network 204 share the tasks. In yet another embodiment, device 202 transmits audio file 230 to communication network 204 for processing by processor 224, as discussed in large part relative to FIG. 1. The discussion of FIG. 2 to follow presumes the last scenario with device 202 transmitting audio file 230 for processing by communication network 204.

In some embodiments, device 202 transmits audio file 230 to communication network 204 as buffer 216 becomes full, on a rolling basis. In this connection, in accordance with some embodiments, buffer 216 is presumed adequately large to accommodate at least a phrase worth of speech data packets. In some embodiments, device 202 transmits less than a buffer full of phrases to communication network 204. For instance, device 202 may transmit one, two, or three phrases as they become available in buffer 216 to communication network 204. In this scenario, device 202 is equipped with the capability to detect the beginning and ending of a phrase. In some embodiments, device 202 may detect silent durations 232 to attempt to distinguish or parse a sentence.

In some embodiments, as speech data packets are received at an audio signal receiver 220 of device 202, device 202 may implement or solicit a speech detection algorithm to determine the start and end of a phrase based on a sequence validating technique. For example, device 202 may implement a segmental conditional random field (CRF) algorithm or use a hidden Markov model (HMM) or a long short-term memory (LSTM) model to predict the end of the audio signal corresponding to a phrase or sentence (or the beginning of a silent duration 232 in FIG. 2). In implementations using model-based prediction, such as with the use of HMM or LSTM models, the model is trained to predict whether the uttered word is a start of the sentence, an intermediate word or the last word of the sentence. As further described relative to FIG. 4, a model is trained with and can therefore predict features such as, without limitation, question tags, WH ("what") words, articles, part-of-speech tags, intonations, syllables, or any other suitable language attributes. The term "tag," as used herein, refers to a label that is attached to, stored with, or otherwise associated with a word or a phrase. For instance, "verb" is an example of a part-of-speech tag that may be associated with the word "running." As used herein, the term "feature" refers to a collection of different types of tag values. Part-of-speech is one example of a feature or a type of tag value. An influential word is another example of a feature or a type of tag value. During the training of the model, a collection of word-to-tag mappings is fed to the model along with an input sentence. As used herein, the term "label" refers to a value or outcome that corresponds to a sample input (e.g., a query, features, or the like) and that may be employed during training of the model. In some examples, the model is trained by way of supervised learning based on labeled data, such as sample inputs and corresponding labels. In some examples, features may be referred to as dependent variables, and labels may be referred to as independent variables.

A sequence validation technique may be executed on a sentence or phrase in a forward and a backward direction for improved prediction reliability but at the expense of requiring a separate model and model training for each direction, a rather costly approach. A sequence structure validation may be employed using conditional probability at its base, for example, the Bayes theorem, to store states at different points in time of a sentence. In some embodiments, an extension to the basic sequence structure validation algorithm may be implemented with Markov chains. Markov chains introduce hidden states at every state transition, for example, between the words of a phrase or sentence, or between syllables of words of a phrase or sentence. The labels used for each such training example are the points in time at which the phrase (spoken utterance) may start and end.

In some embodiments, the start of a phrase is typically driven by decisions taken during the handling of the last packet of a phrase, and a list of contextual information is passed to the next audio chunk (or packet). In some cases, a silent duration of a predefined duration may be detected in real time to help shift to a new context. In some embodiments, silent duration detection may be implemented based on heuristics. For example, heuristics of reconfigurable manufacturing systems (RMS) values representing speech data amplitude may be processed to detect silent durations in an audio file, such as the audio file 230 of FIG. 2.

In implementations with communication network 204 facilitating packet processing, processor 224 may achieve phrase detection by implementing the foregoing speech detection algorithms described with reference to device 202. For example, in an instance of audio file 230, audio file 230', shown at processor 224 of communication network 204 in FIG. 2, silent duration 232' (232a', 232b', and 232c') may be detected to isolate or distinguish each of the phrases 234' (234a', 234b', and 234c'). In the example of FIG. 2, phrase 2, 234b' is shown detected at processor 224.

Figure 3:
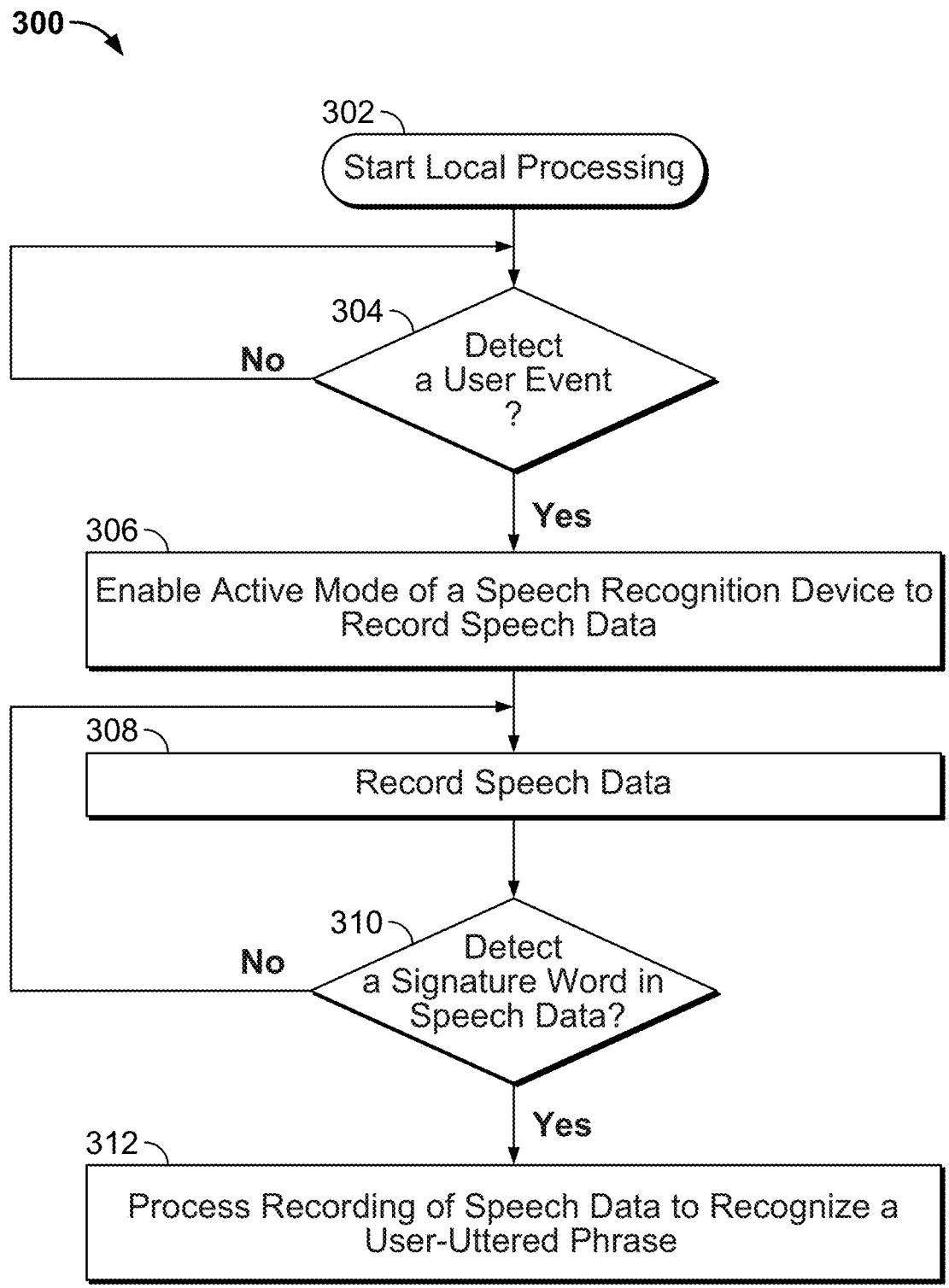
FIG. 3 depicts an illustrative flowchart of a speech recognition process, in accordance with some embodiments of the disclosure.

FIG. 3 shows an illustrative flowchart of a speech recognition process 300, in accordance with some embodiments of the disclosure. Process 300 may be performed, partially or in its entirety, by a voice-assisted device, such as devices 102 and 202 of FIGS. 1 and 2, respectively. In some embodiments, process 300 may be performed by control circuitry 704 (FIG. 7). In some embodiments, process 300 may be performed locally or remotely or a combination thereof. For example, process 300 may be performed, partially or in its entirety, by processor 124 or processor 224 of FIGS. 1 and 2, respectively. Process 300 may be performed by a combination of a voice-assisted device and a remote process, for example, device 102 and processor 124 or device 202 and processor 224.

At 302, process 300 begins, and at step 304, a device implementing process 300 waits for the detection of a user event, such as a user movement, as previously discussed. In response to the detection of a user event at step 304, process 300 proceeds to step 306, and an active mode of the device is enabled to start generating a recording of the incoming speech data packets. Next, at step 308, the speech data is recorded and process 300 proceeds to step 310. At step 310, the device implementing process 300 looks for a signature word in the recorded speech data. In response to the detection of a signature word at step 310, process 300 proceeds to step 312, and at step 312, the recorded speech data is processed as described in accordance with various disclosed methods. For example, the recorded speech data may be transmitted to a network cloud device for processing. After step 312, process 300 resumes starting at step 304 to look for the next user event. At step 304, a device implementing process 300 waits to detect a user event before proceeding to step 306, and in some embodiments, the device may abandon waiting for detection in response to a time out period or in response to a manual intervention, for example, by a user device.

Figure 4:
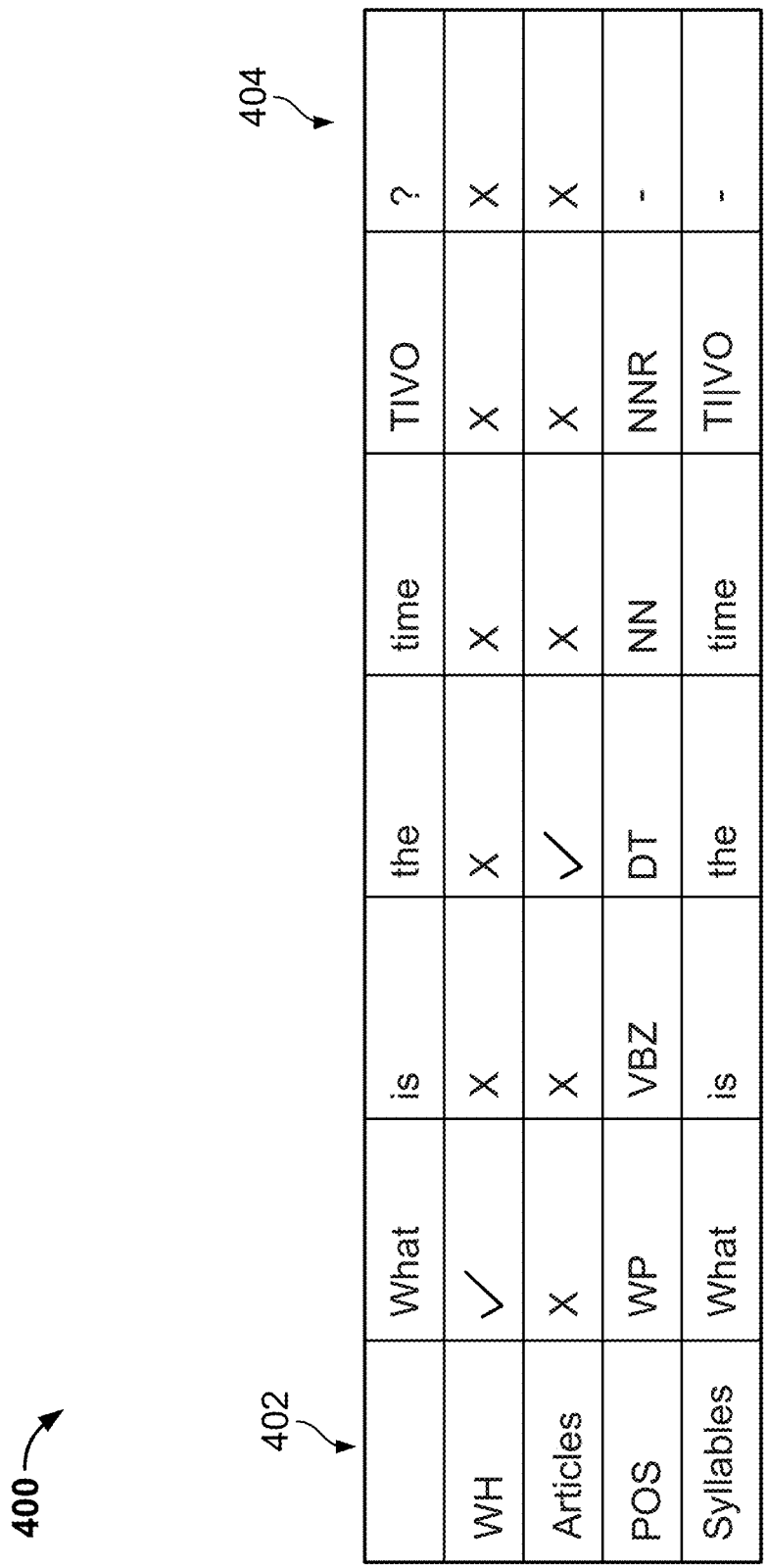
FIG. 4 depicts an example speech detection technique, in accordance with some embodiments of the disclosure.

As earlier noted, in some embodiments, at a communication network or a voice-enabled device, such as, without limitation, communication networks 104, 204 and devices 102, 202, respectively, a model may be trained with various sentence features. For example, the model may be trained with the earlier-enumerated language attributes. Once the model has been trained, devices 102, 202 may utilize the model to generate language attributes for a given sequence of inputted utterances. FIG. 4 shows an example table 400 of an output that devices 102, 202 may generate by employing one or more speech detection techniques or algorithms upon a sequence of utterances, in accordance with some disclosed embodiments. In some aspects, the utterance (or sentence) structure features shown in FIG. 4 may be used to train a model of various disclosed embodiments and methods.

Example types of algorithms that devices 102, 202 may employ include, without limitation, algorithms that determine whether each term in a query is a "WH" term (e.g., based on text generated from the utterances), determine whether each term in the query is an article (e.g., "a" or "the"), determine a part-of-speech for each term of the query, and determine the syllables of each term in the query. In some examples, the "WH" terms and article detection may be performed by processing text strings that are generated from the utterances. Example parts of speech algorithms that devices 102, 202 may employ, for instance, include those that are provided by the Natural Language Toolkit (NLTK), spaCy, and/or other natural language processing providers. Some of such algorithms train parts of speech models using classifiers such as DecisionTree, vectorizers, and/or the like. In one example, syllables are extracted from utterances by using a raw audio signal to detect multiple audio features and voice activity. Praat/Praat-Parselmouth is one example of an open source tool kit that may be employed for such syllable extraction. In another example, an Ancient Soundex algorithm can extract syllables from utterances by using text generated based on the utterances. Metaphone, Double metaphone, and Metaphone-3 are example algorithms that may perform text-based syllable extraction.

Table 400 includes columns 404 with each column including a word of the phrase "What is the time, TWO?", for example, uttered by user 106 or user 206 of FIGS. 1 and 2, respectively. Table 400 further includes rows 402, with each row representing a tag or a training feature. For example, the first row is for the feature "WH," the second row is for the feature "articles," the third row is for the feature "POS" and the fourth row is for the feature "syllables." An acoustic model may be trained with a set of features that are in part or in whole different than the feature set of FIG. 4, or the model may be trained with a feature set that includes less than four or more than four features. In general, the greater the number of sentence features the model trains with, the greater the accuracy of sentence prediction.

Table 400 entries are marked based on the feature corresponding to each word of the sentence "What is the time, TIVO?". For example, "What" corresponds to the feature "WH" but the word "is" or the word "the" or "time" do not. Accordingly, a checkmark is placed in the entry of table 400 at the first row and first column. Similarly, the word "the" is an article and marked accordingly in the second row, third column of Table 400 and so on. In this respect, an acoustic model is trained to predict the words of a sentence and therefore the entire sentence. In a practical example, the model may be used to predict the words of a sentence at step 312 of process 300 (FIG. 3) and step 510 of FIG. 5.

Figure 5:
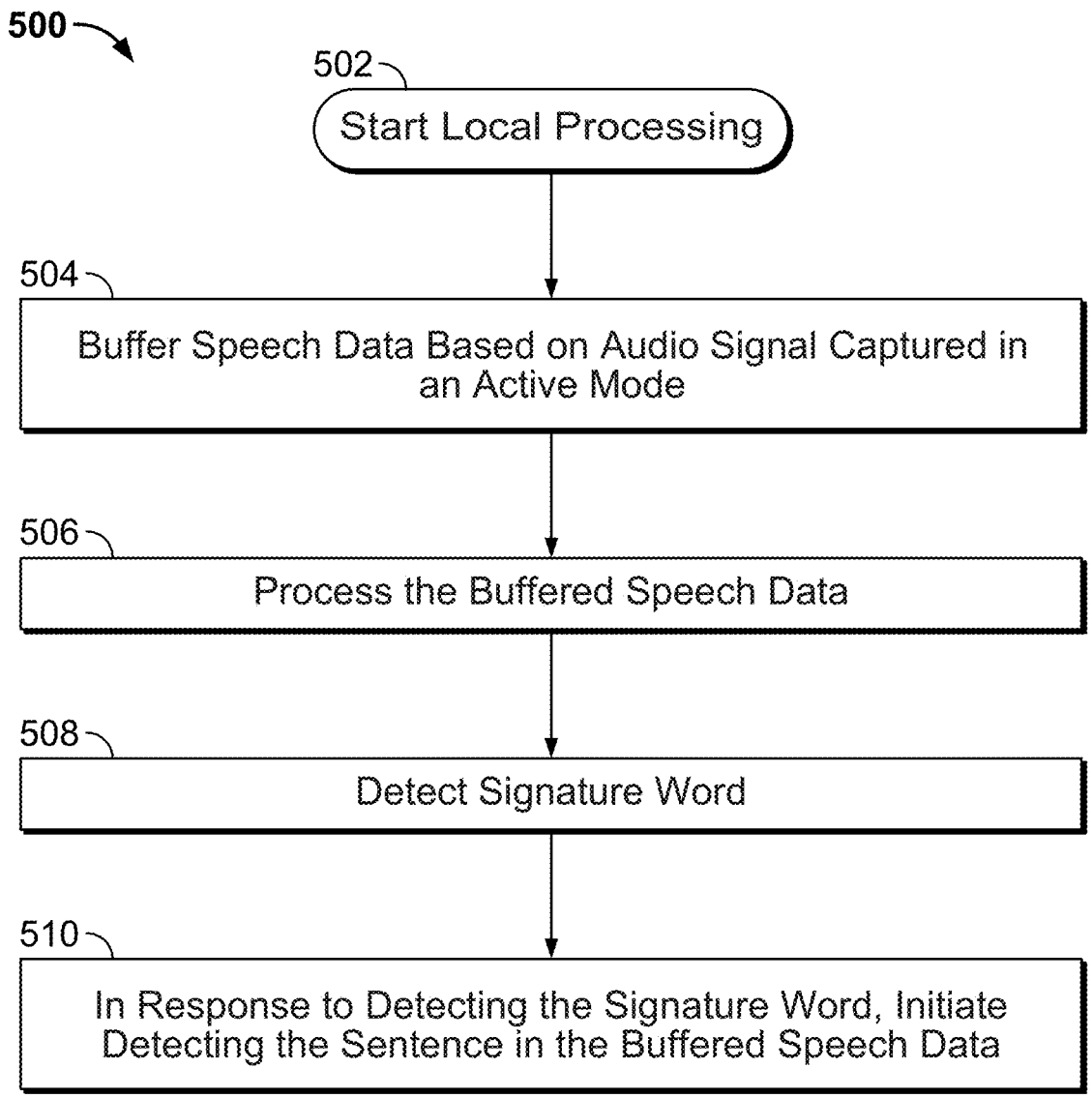
FIG. 5 depicts an illustrative flowchart of a speech recognition process, in accordance with some embodiments of the disclosure.

FIG. 5 shows an illustrative flowchart of a speech recognition process, in accordance with some embodiments of the disclosure. In FIG. 5, a process 500 may be performed by a voice-assisted device, such as devices 102 and 202 of FIGS. 1 and 2, respectively, to process incoming speech data packets. In some embodiments, the steps of process 500 may be performed by control circuitry 704 of FIG. 7. In summary, process 500 presents an example of a method for detecting a spoken sentence in a speech recognition system as disclosed herein. Speech data is buffered based on an audio signal captured at a control circuitry operating in an active mode. The speech data is buffered irrespective of whether the speech data comprises a signature word. The buffered speech data is processed to detect the presence of a sentence comprising at least one command and a query for the computing device. Processing the buffered speech data includes detecting the signature word in the buffered speech data, and, in response to detecting the signature word in the speech data, initiating detection of the sentence in the buffered speech data.

More specifically and with reference to FIG. 5, at 502, process 500 starts and continues to step 504 where packets of speech data, corresponding to a user-spoken sentence, are buffered based on an audio signal captured in an active mode, as earlier described. The packets are previously received, for example, at audio signal receiver 120 or receiver 220 of devices 102 and 202, respectively. While in active mode, the received data packets may be recorded in buffer 116 or buffer 216 of devices 101 and 102, respectively. Next, at step 506, the buffered speech data packets are processed. The voice-assisted device, such as may be implemented by control circuitry 704 (FIG. 7), detects the signature word at step 508, followed, at step 510, by initiating detection of the sentence in the buffered speech data, in response to detecting the signature word at step 508, in step 510. Steps 508 and 510 are part of the processing that starts at step 508. Processing is performed while the device remains in active mode. In some embodiments, the device leaves the active mode in response to a manual configuration, such as in response to receiving a corresponding user device signal. In some embodiments, the device may leave an active mode if a signature word is not found during a predefined time period at step 508. In some embodiments, the device leaves the active mode in response to receiving speech data packets corresponding to an entire spoken sentence.

Figure 6:
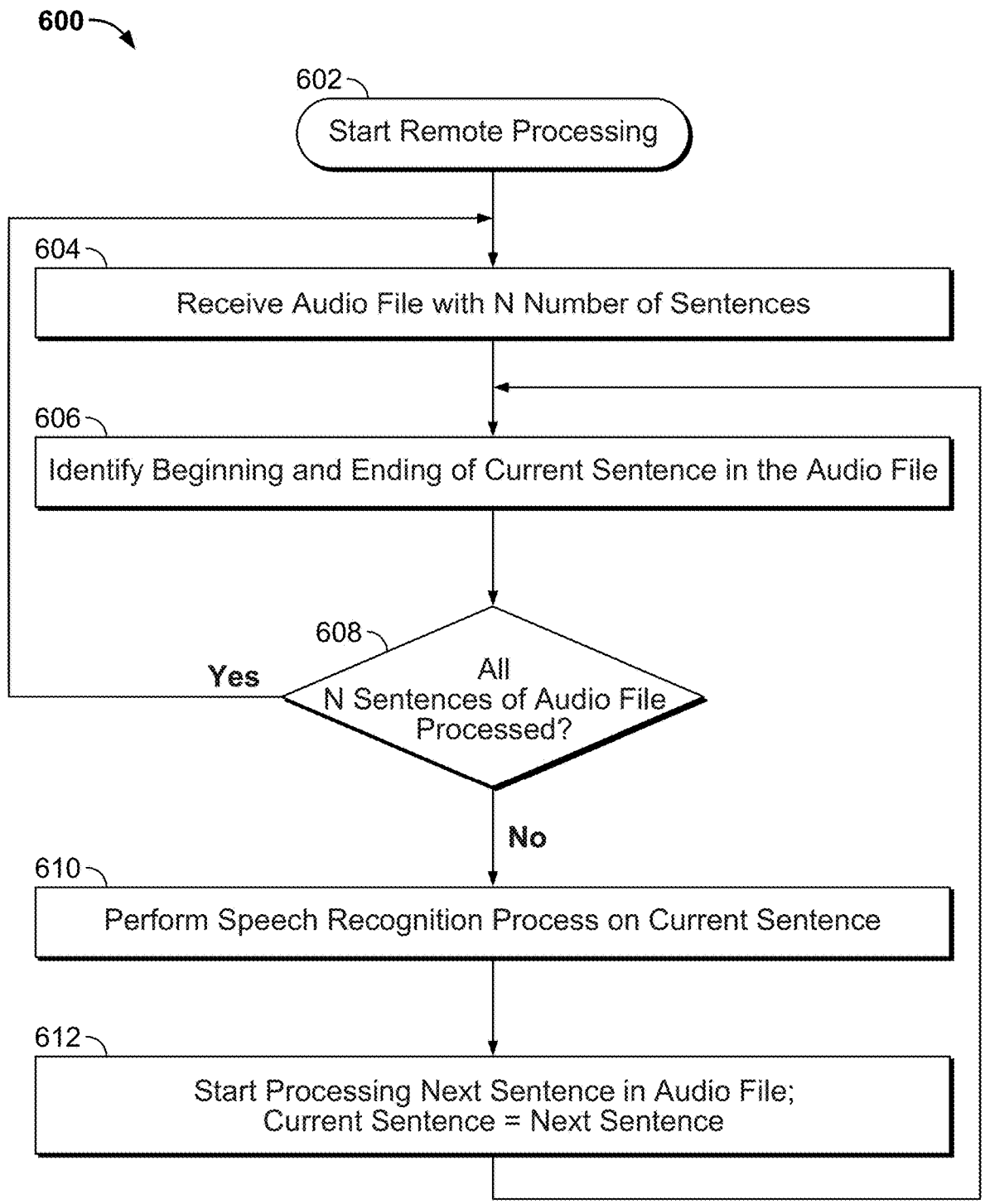
FIG. 6 depicts an illustrative flowchart of a speech recognition process, in accordance with some embodiments of the disclosure.

FIG. 6 shows an illustrative flowchart of a speech recognition process, in accordance with some embodiments of the disclosure. In FIG. 6, a process 600 may be performed by a remotely located (relative to a communicatively coupled voice-assisted device) processor, such as processor 124 of FIG. 1 or processor 224 of FIG. 2. Process 600 begins at 602 and continues to step 604 where an audio file with recorded packets of speech data corresponding to at least one spoken sentence is received. In FIG. 6, the audio file is presumed to include N number of packets, "N" representing an integer value. In some embodiments, the audio file of step 604 may be received from device 102 or device 202. Next, at step 606, the beginning and ending of the sentence in the audio file of step 604 are identified. If, at step 608, process 600 determines that all N sentences of the audio file have been processed, process 600 continues to step 604 and starts to process the next audio file after it is received as previously described. If, at step 608, process 600 determines not all sentences of the audio file have been processed, process 600 proceeds to step 610. At step 610, the current sentence, the sentence identified at step 606, is processed and next, at step 612, the processing of the next sentence of the audio file begins, and the "current" sentence of the following steps in process 600, i.e., steps 604 through 610, is the next sequential sentence in the audio file. In some embodiments, phrases of an audio file need not be sequentially processed. For example, phrase 3 may be processed before phrase 2 in FIG. 2. But in certain implementations using context speech recognition techniques, the accuracy of sentence prediction may improve if the sentences are sequentially processed.

At step 610, the current sentence may be transmitted to a remote automated speech recognition (ASR) service for text transcription. In some embodiments, ASR services may be performed on the audio file after all sentences of the file have been processed. In process 600, ASR services are presumed performed on a sentence basis rather than on an audio file basis.

The order of steps of each of the processes 300, 500 and 600, as shown in the flowcharts of FIGS. 3, 5, and 6, respectively, may be suitably changed or exchanged. One or more steps, as may be suitable, can be added or deleted to each of the processes 300, 500 and 600.

A user may access, process, transmit and receive content, in addition to other features, for example to carry out the functions and implementations shown and described herein, with one or more user devices (i.e., user equipment). FIG. 7 shows generalized embodiments of an illustrative user device. In some embodiments, user device 700 may be configured, in whole or in part, as a computing device. Although illustrated as a mobile user device (e.g., a smartphone), user device 700 may include any user electronic device that performs speech recognition operations as disclosed herein. In some embodiments, user device 700 may incorporate, in part or in whole, or be communicatively coupled to, each of devices 102 and 202 of FIGS. 1 and 2. In some embodiments, user device 700 may include a desktop computer, a tablet, a laptop, a remote server, any other suitable device, or any combination thereof, for speech detection and recognition processing, as described above, or accessing content, such as, without limitation, wearable devices with projected image reflection capability, such as a head-mounted display (HMD) (e.g., optical head-mounted display (OHMD)), electronic devices with computer vision features, such as augmented reality (AR), virtual reality (VR), extended reality (XR), or mixed reality (MR), portable hub computing packs, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some embodiments, the user device may have a front-facing screen and a rear-facing screen, multiple front screens, or multiple angled screens. In some embodiments, the user device may have a front-facing camera and/or a rear-facing camera. On these user devices, users may be able to navigate among and locate the same content available through a television. Consequently, a user interface in accordance with the present disclosure may be available on these devices, as well. The user interface may be for content available only through a television, for content available only through one or more of other types of user devices, or for content available both through a television and one or more of the other types of user devices. The user interfaces described herein may be provided as online applications (i.e., provided on a website), or as stand-alone applications or clients on user equipment devices. Various devices and platforms that may implement the present disclosure are described in more detail below.

In some embodiments, display 712 may include a touchscreen, a television display or a computer display. In a practical example, display 712 may display detected phrases from user utterances, as processed by devices 102 and 202 or at communication networks 104 and 204. Alternatively, or additionally, display 712 may show a respective user the terms of a user privacy agreement, as previously discussed relative to FIGS. 1 and 2. Display 712 may optionally show text results received from an ASR service. In some embodiments, the one or more circuit boards illustrated include processing circuitry, control circuitry, and storage (e.g., RAM, ROM, Hard Disk, Removable Disk, etc.). In some embodiments, the processing circuit, control circuitry, or a combination thereof, may implement one or more of the processes of FIGS. 3, 5, and 6. In some embodiments, the processing circuitry, control circuitry, or a combination thereof, may implement one or more functions or components of the devices of FIGS. 1 and 2, such as devices 102 and 202, and/or processors 124 and 224. For example, each or a combination of activity detector 118 or 218 and processor 124 or 224 of FIGS. 1 and 2 may be implemented by the processing circuitry, control circuitry or a combination of the processing circuitry and control circuitry.

In some embodiments, circuit boards include an input/output path. User device 700 may receive content and data via input/output (hereinafter "I/O") path 702. I/O path 702 may provide content and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for an application stored in memory (e.g., storage 708). Specifically, control circuitry 704 may be instructed by the application to perform the functions discussed above and below. For example, the application may provide instructions to control circuitry 704 to perform speech detection and recognition processes as described herein. In some implementations, any action performed by control circuitry 704 may be based on instructions received from the application.

In some client/server-based embodiments, control circuitry 704 includes communications circuitry suitable for communicating with an application server or other networks or servers. The instructions for carrying out the above-mentioned functionality may be stored on the application server. Communications circuitry may include a wired or wireless modem or an ethernet card for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" or "memory" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, for example, may be used to supplement storage 708 or instead of storage 708. In some embodiments, storage 708 may incorporate, in part or in whole, buffer 116 and buffer 216 of FIGS. 1 and 2, respectively.

In some embodiments, display 712 is caused by generation of a display by devices 102 and 202 of FIGS. 1 and 2, respectively, or user devices coupled to devices 102 and 202. A user may send instructions to control circuitry 704 using user input interface 710. User input interface 710, display 712, or both may include a touchscreen configured to provide a display and receive haptic input. For example, the touchscreen may be configured to receive haptic input from a finger, a stylus, or both. In some embodiments, equipment device 700 may include a front-facing screen and a rear-facing screen, multiple front screens, or multiple angled screens. In some embodiments, user input interface 710 includes a remote-control device having one or more microphones, buttons, keypads, any other components configured to receive user input or combinations thereof. For example, user input interface 710 may include a handheld remote-control device having an alphanumeric keypad and option buttons.

Audio equipment 714 may be provided as integrated with other elements of user device 700 or may be stand-alone units. The audio component of videos and other content displayed on display 712 may be played through speakers of audio equipment 714. In some embodiments, the audio may be distributed to a receiver (not shown), which processes and outputs the audio via speakers of audio equipment 714. In some embodiments, for example, control circuitry 704 is configured to provide audio cues to a user, or other audio feedback to a user, using speakers of audio equipment 714. Audio equipment 714 may include a microphone configured to receive audio input such as voice commands or speech. For example, a user may speak letters or words that are received by the microphone and converted to text by control circuitry 704. In a further example, a user may voice commands that are received by the microphone and recognized by control circuitry 704.

An application may be implemented using any suitable architecture. For example, a stand-alone application may be wholly implemented on user device 700. In some such embodiments, instructions for the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or it may be non-transitory including, but not limited to, volatile and non-volatile computer memory or storage devices such as a hard disk, floppy disk, USB drive, DVD, CD, media cards, register memory, processor caches, Random Access Memory (RAM), etc.

In some embodiments, the application is a client/server-based application. Data for use by a thick or thin client implemented on user device 700 is retrieved on demand by issuing requests to a server remote from user device 700. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on user device 700. This way, the processing of the instructions is performed remotely by the server while the resulting displays (e.g., that may include text, a keyboard, or other visuals) are provided locally on user device 700. User device 700 may receive inputs from the user via input interface 610 and transmit those inputs to the remote server for processing and generating the corresponding displays. For example, user device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to user device 700 for presentation to the user.

Figure 8:
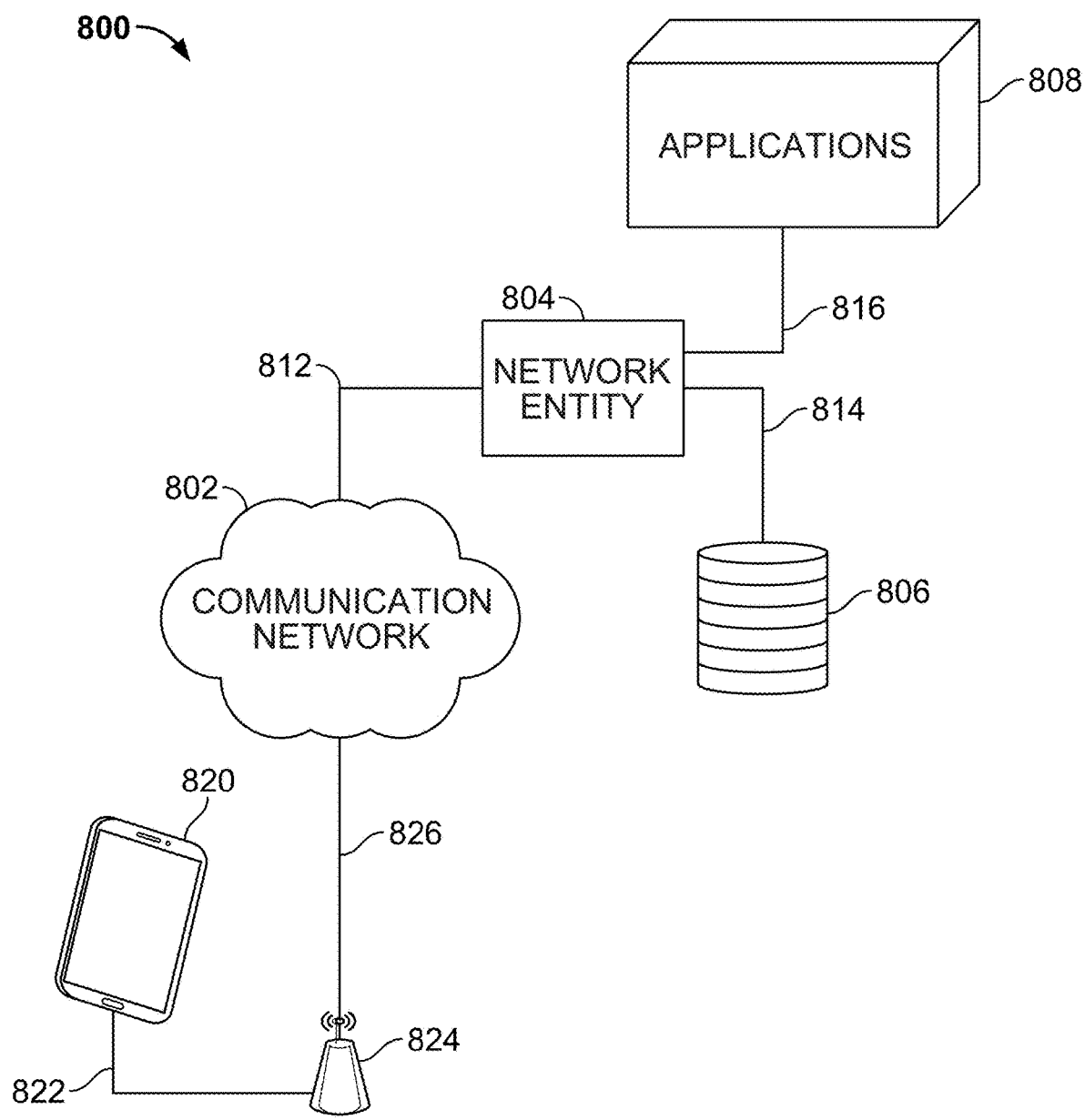
FIG. 8 is a block diagram of an illustrative system for transmitting information, in accordance with some embodiments of the present disclosure.

FIG. 8 is a block diagram of illustrative system 800 for transmitting messages, in accordance with some embodiments of the present disclosure. In system 800, there may be more than one of each type of user device, but only one of each is shown in FIG. 8 to avoid overcomplicating the drawing. In addition, each user may utilize more than one type of user device and more than one of each type of user device.

User device 820, illustrated as a wireless-enabled device, may be coupled to communication network 802 (e.g., the Internet). For example, user device 820 is coupled to communication network 802 via communications path 822 to access point 824 and wired connection 826. User device 820 may also include wired connections to a LAN, or any other suitable communications link to network 802. Communication network 802 may be one or more networks including the Internet, a mobile phone network, mobile voice or data network (e.g., a WIFI, WiMAX, GSM, UTMS, CDMA, TDMA, 3G, 4G, 4G, 5G, Li-Fi, LTE network), cable network, public switched telephone network, or other types of communication network or combinations of communication networks. Path 812 may include one or more communications paths, such as a satellite path, a fiber-optic path, a cable path, a path that supports Internet communications, a free-space connection (e.g., for broadcast or other wireless signals), or any other suitable wired or wireless communications path or combination of such paths.

System 800 includes network entity 804 (e.g., a server or other suitable computing device) coupled to communication network 802 via communications path 812. Communications with network entity 804 may be exchanged over one or more communications paths but are shown as a single path in FIG. 8 to avoid overcomplicating the drawing. Network entity 804 is configured to access database 806 or applications 808 (e.g., an applications database or host server) via communications links 814 and 816, respectively. Although shown as a separate device, network entity 804 may include database 806 and applications 808 (e.g., stored in memory). In addition, there may be more than one of each of database 806 and applications 808, but only one of each is shown in FIG. 8 to avoid overcomplicating the drawing. In some embodiments, database 806 and applications 808 may be integrated as one source device (e.g., that may be, but need not be, network entity 804).

Database 806 may include one or more types of stored information, including, for example, relationship information, a relationship entity database, recipient information, historical communications records, user preferences, user profile information, a template database, any other suitable information, or any combination thereof. Applications 808 may include an applications-hosting database or server, plug-ins, a software developers kit (SDK), an applications programming interface (API), or other software tools configured to provide software (e.g., as download to a user device); run software remotely (e.g., hosting applications accessed by user devices); or otherwise provide applications support to applications of user device 820. In some embodiments, information from network entity 804, database 806, applications 808, or a combination thereof may be provided to a user device using a client/server approach. For example, user device 820 may pull information from a server, or a server may push information to user device 820. In some embodiments, an application client residing on user device 820 may initiate sessions with database 806, applications 808, network entity 804, or a combination thereof to obtain information when needed (e.g., when data is out-of-date or when a user device receives a request from the user to receive data). In some embodiments, information may include user information. For example, the user information may include current and/or historical user activity information (e.g., what communications the user engages in, what times of day the user sends/receives messages, whether the user interacts with a social network, at what times the user interacts with a social network to post information, what types of content the user typically inserts in messages, stored contacts of the user, frequent contacts of the user, any other suitable information, or any combination thereof. In some embodiments, the user information may identify patterns of a given user for a period of more than one year.

In some embodiments, an application may include an application program processor implementing some of the processes and methods disclosed herein as a stand-alone application implemented on user device 820. For example, the application may be implemented as software or a set of executable instructions, which may be stored in storage (e.g., storage 708) of the user device (e.g., user device 700), and executed by control circuitry (e.g., control circuitry 704) of the user device (e.g., user device 700). In some embodiments, an application may include an automatic program retrieval application that is implemented as a client/server-based application where only a client application resides on the user device, and a server application resides on a remote server (e.g., network entity 804). For example, an automatic program retrieval application may be implemented partially as a client application on user device 820 (e.g., by control circuitry 704 of user equipment device 700) and partially on a remote server as a server application running on control circuitry of the remote server (e.g., control circuitry of network entity 804). When executed by control circuitry of the remote server, the automatic program retrieval application may instruct the control circuitry to generate the displays and transmit the generated displays to user device 820. The server application may instruct the control circuitry of the remote device to transmit data for storage on user device 820. The client application may instruct control circuitry of the receiving user device to generate the application displays.

In some embodiments, the arrangement of system 800 is a cloud-based arrangement. The cloud provides access to services, such as information storage, messaging, or social networking services, among other examples, as well as access to any content described above, for user devices. Services can be provided in the cloud through cloud computing service providers, or through other providers of online services. For example, the cloud-based services can include a storage service, a sharing site, a social networking site, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a desktop application, a mobile application, and/or any combination of the same access applications. The user device may be a cloud client that relies on cloud computing for application delivery, or the user equipment device may have some functionality without access to cloud resources. For example, some applications running on the user device may be cloud applications (e.g., applications delivered as a service over the Internet), while other applications may be stored and run on the user device. In some embodiments, a user device may receive information from multiple cloud resources simultaneously.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for detecting a sentence including at least one of a command and a query in a speech recognition system, the method comprising:

detecting, while a computing device is in a non-active mode, a user activity that suggests a user intention to interact with the computing device, wherein speech data is not buffered by the computing device in the non-active mode;

in response to detecting the user activity, enabling an active mode and buffering speech data based on an audio signal captured at the computing device operating in the active mode, wherein the speech data is buffered in the active mode irrespective of whether the speech data comprises a signature word; and processing the buffered speech data to detect a presence of the sentence comprising at least one of the command and the query for the computing device, wherein processing the buffered speech data comprises:

detecting the signature word in the buffered speech data;

in response to detecting the signature word in the speech data, initiating detection of the sentence in the buffered speech data; and detecting the sentence by identifying a beginning portion of the sentence in the buffered speech data and determining that the beginning portion of the sentence precedes a portion of the sentence corresponding to the signature word.

2. The method of claim 1, further comprising detecting the sentence based on a sequence validating technique or based on a model trained to distinguish between user commands and user assertions.

3. The method of claim 1, further comprising detecting the sentence by detecting silent durations occurring before and after, respectively, the sentence in the speech data, wherein detecting the silent durations is based on speech amplitude heuristics of the speech data.

4. The method of claim 1, wherein detecting the signature word is performed at the computing device or at a server remote from the computing device.

5. The method of claim 1, further comprising transmitting the speech data to a speech recognition processor for performing automated speech recognition (ASR) on the speech data.

6. The method of claim 1, further comprising identifying the beginning portion of the sentence and an end portion of the sentence based on a trained model selected from one of a hidden Markov model (HMM), a long short-term memory (LSTM) model, and a bidirectional LSTM.

7. The method of claim 1, wherein detecting the signature word is based on heuristics of audio signatures of a demographic region.

8. The method of claim 1, wherein the computing device operates in the active mode only in response to receiving a user consent.

9. The method of claim 1, wherein detecting the user activity comprises determining that a user has turned to face the computing device.

10. A system for detecting a sentence including at least one of a command and a query in a speech recognition system, the system comprising:
   a memory; and
   control circuitry communicatively coupled to the memory and configured to:
      detect, while a computing device is in a non-active mode, a user activity that suggests a user intention to interact with the computing device, wherein speech data is not buffered by the computing device in the non-active mode;
   in response to detecting the user activity, enable an active mode and buffer in the memory speech data based on an audio signal captured at the computing device operating in the active mode, wherein the speech data is buffered in the active mode irrespective of whether the speech data comprises a signature word; and
   process the buffered speech data to detect a presence of the sentence comprising at least one of the command and the query for the computing device, wherein in processing the buffered speech data, the control circuitry is configured to:
      detect the signature word in the buffered speech data;
      in response to detecting the signature word in the speech data, initiate detection of the sentence in the buffered speech data; and
      detect the sentence by identifying a beginning portion of the sentence in the buffered speech data and determining that the beginning portion of the sentence precedes a portion of the sentence corresponding to the signature word.

11. The system of claim 10, wherein the control circuitry is further configured to detect the sentence based on a sequence validating technique or based on a model trained to distinguish between user commands and user assertions.

12. The system of claim 10, wherein the control circuitry is further configured to:
   detect the signature word by detecting silent durations occurring before and after, respectively, the sentence in the speech data; and the
   detect the silent durations based on speech amplitude heuristics of the speech data.

13. The system of claim 10, wherein the memory is local to the computing device.

14. The system of claim 10, wherein the control circuitry is further configured to detect the signature word at the computing device.

15. The system of claim 10, wherein the control circuitry is configured to transmit the buffered data packets to a remotely located server to detect the signature word.

16. The system of claim 10, wherein the control circuitry is further configured to transmit the speech data to a speech recognition processor for performing automated speech recognition (ASR) on the speech data.

17. The system of claim 10, wherein the control circuitry is further configured to identify the beginning portion of the sentence and an end portion of the sentence based on a trained model selected from one of a hidden Markov model (HMM), a long short-term memory (LSTM) model, and a bidirectional LSTM.

18. The system of claim 10, wherein detection of the signature word is based on heuristics of audio signatures of a demographic region.

19. The system of claim 10, wherein the control circuitry is configured to operate in the active mode only in response to receiving a user consent.

20. The system of claim 10, wherein detecting the user activity comprises determining that a user has turned to face the computing device.

* * * * *